Jan. 2, 1923.
I. F. KINNARD.
METHOD AND APPARATUS FOR TESTING WELDS.
FILED APR. 21, 1921.
1,440,470
2 SHEETS-SHEET 1
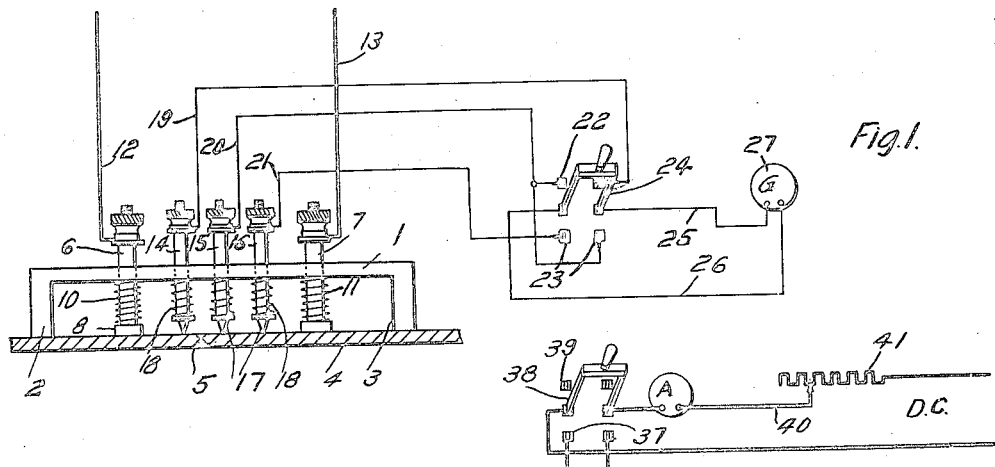
Fig. 1.
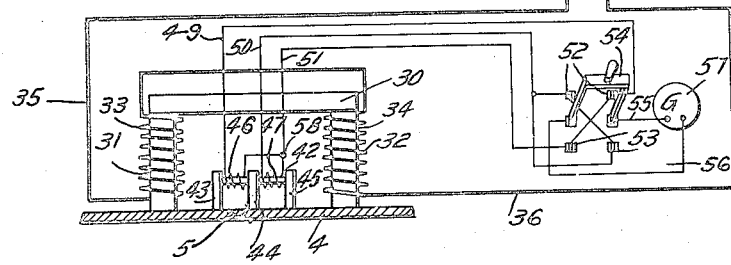
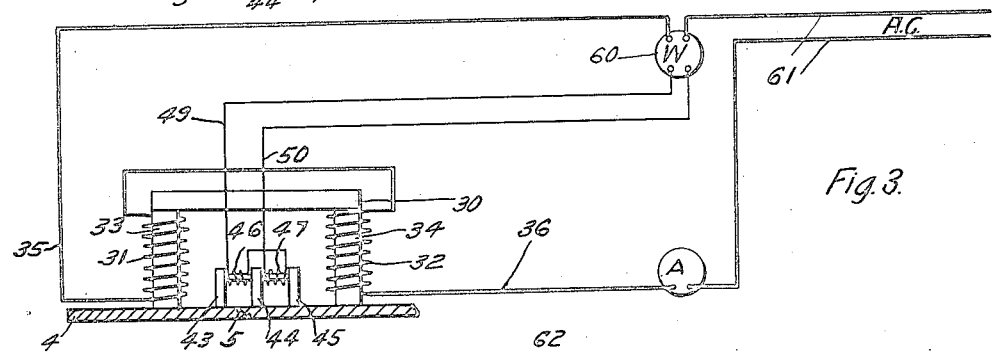
Fig. 2
Fig. 3.
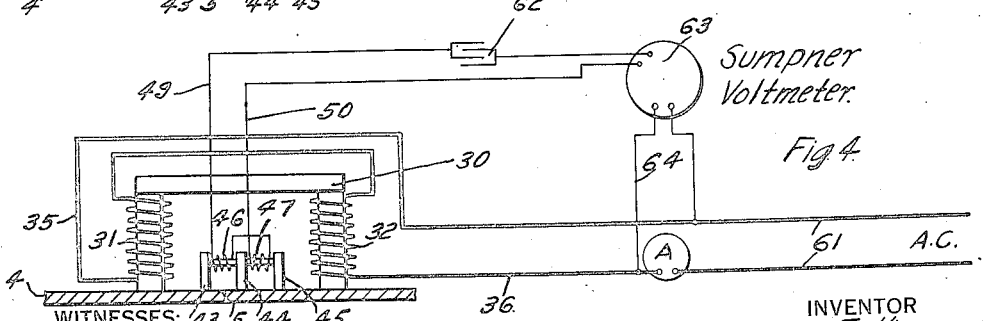
Sumpner Voltmeter.
Fig. 4.
WITNESSES:
INVENTOR
Isaac F. Kinnard
BY
ATTORNEY Jan. 2, 1923.
I. F. KINNARD.
METHOD AND APPARATUS FOR TESTING WELDS.
FILED APR. 21, 1921.
1,440,470
2 SHEETS-SHEET 2
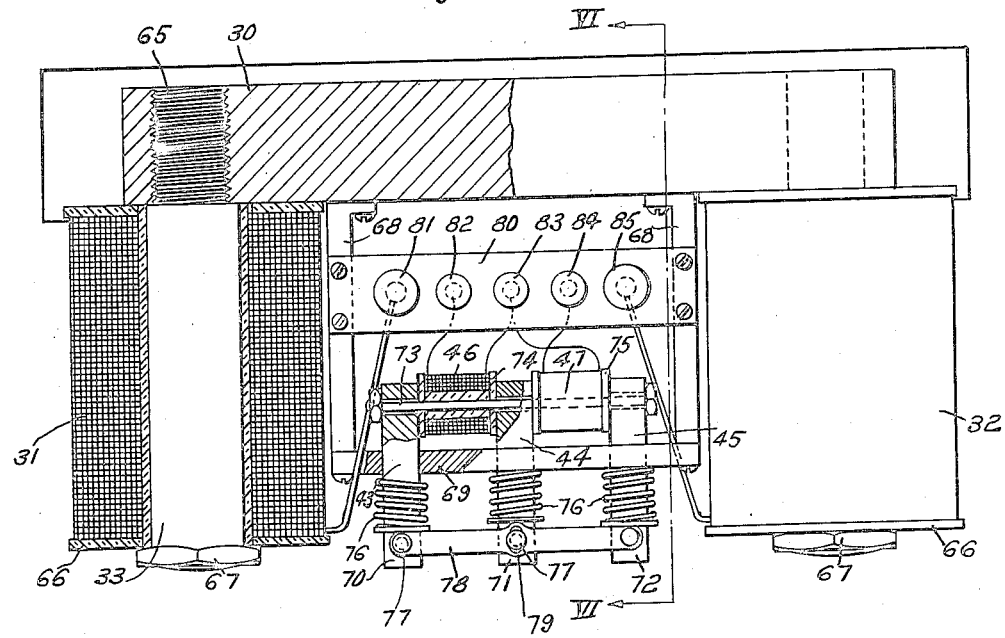
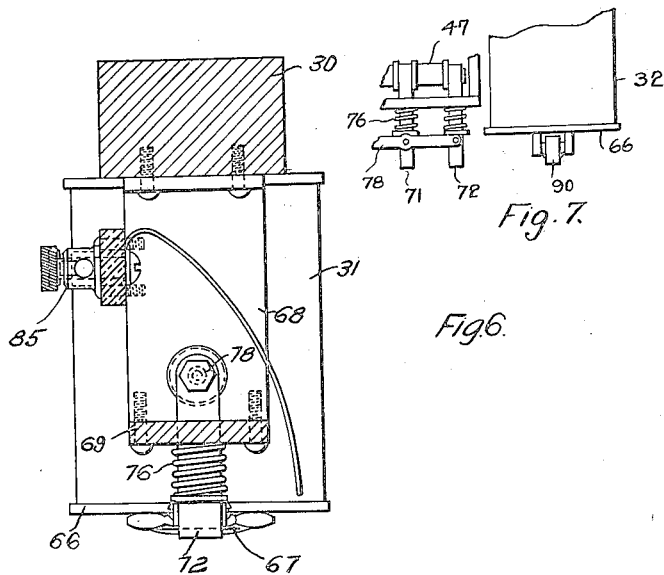
WITNESSES:
INVENTOR
Isaac F. Kinnard.
BY
ATTORNEY Patented Jan. 2, 1923.

1,440,470

UNITED STATES PATENT OFFICE.

ISAAC F. KINNARD, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD AND APPARATUS FOR TESTING WELDS.

Application filed April 21, 1921. Serial No. 463,162.

*To all whom it may concern:*

Be it known that I, ISAAC F. KINNARD, a citizen of the United States, and a resident of Wilkinsburg, in the county of Allegheny and State of Pennsylvania, have invented a new and useful Improvement in Methods of and Apparatus for Testing Welds, of which the following is a specification.

This invention relates to testing, more particularly to a method of and apparatus for the testing of welded articles.

Welding is coming into extensive use for joining bodies of various shapes, more especially for welding plates together instead of riveting. In making welds, it is imperative that the strength of the welded portion be comparable to that of the rest of the material. Up to this time, it has been practically impossible to determine, without a destructive test, the relative strength of the weld and the body of the material. As is well known, a weld may appear perfect but still be so defective as to render the welded structure unsafe because of hidden defects in the interior of the welded section.

My invention is designed to provide a ready means of testing the quality of welds without resorting to destructive tests, it being among the objects of my invention to devise a method of testing and an apparatus for carrying my method into effect which is simple and accurate.

My invention is based on the observation that, if the welded portion of an article is uniform and, therefore, of the same quality as the body of the material, the electrical resistance and the magnetic reluctance thereof are approximately the same as those of the body portion and are uniform along the weld. Any differences in resistance or reluctance usually indicate that the weld is defective in some respects. For instance, if the weld contains hard spots or blow holes or oxidized portions, the resistance or reluctance thereof is increased. My invention contemplates a method of and means for determining the resistance or reluctance of the weld compared to that of an equal amount of the original material.

In practising my invention, I may utilize either the current conductivity of the welded material or the flux-carrying capacity thereof to determine the quality of a welded portion of the material. In order to accomplish this, I provide a source of electrical energy which is so positioned as to cause current or magnetic flux to pass between a pair of electrodes through the portion of the material containing the weld to be tested. I then measure the potential drop across the weld and compare said drop to that produced in an equal length of the original material.

More specifically, I provide a yoke member on which are secured a pair of electrodes which are adapted to bridge a weld in contact with the welded body, such as a steel plate. Mounted on the yoke, between the said electrodes, are a plurality of contact members equally spaced and preferably placed symmetrical with respect to the electrodes. The contact members are connected in a suitable manner to a measuring instrument.

If the electrical method of testing is to be used, direct current is passed between the electrodes, and the potential drop across the weld and adjacent the weld are measured by the measuring instrument connected to the contact members, two of which are placed on the sides of the weld and a third adjacent thereto.

If the magnetic method of testing is to be utilized, current is passed through coils surrounding the electrodes which are in contact with the plate and which bridge the gap. The contact members have coils wound in proximity thereto, said coils being connected to a suitable measuring instrument. The difference in drop of magnetic potential across the weld and adjacent thereto is measured by the current induced in the coils, the said current being measured by the measuring instrument in the circuit.

In the accompanying drawings forming a part hereof and illustrating several embodiments of my invention, Fig. 1 is a diagrammatic view of my apparatus for testing welds in position for use, illustrating the electrical method of testing;

Fig. 2 is a diagrammatic view of a similar apparatus for testing welds by the magnetic method;

Figs. 3 and 4 are views similar to Fig. 2 illustrating slightly modified forms of the invention;

Fig. 5 is an enlarged detail view, some parts being shown in section, of the electrode and contact member arrangement of Figs. 2, 3 and 4, Fig. 6 is a sectional view along the line VI—VI of Fig. 5, and Fig. 7 is a fragmentary view of Fig. 5 showing a slight modification thereof.

Referring to the embodiment shown in Fig. 1, the yoke or frame 1 has legs 2 and 3 adapted to be placed in contact with or secured to a plate 4, the weld 5 of which is to be tested. The frame 1 may be secured to a suitable base or support and the plate to be tested passed thereunder.

Electrodes 6 and 7 are slidably mounted in yoke 1, the lower ends 8 and 9 respectively thereof being somewhat enlarged and in contact with the plate 4. Springs 10 and 11 on said electrodes serve to yieldingly hold the lower portions 8 and 9 in firm contact with the plate. Contact members 14, 15 and 16, the lower ends 17 of which are pointed, are also slidably mounted in the yoke 1 and are yieldably held in contact with the plate 4 by springs 18. The contact members are equally spaced and preferably placed symmetrically with respect to the electrodes 6 and 7.

Conductors 19, 20 and 21 lead from contact members 14, 15 and 16, respectively, to the pairs of contacts or poles 22 and 23 of a double-pole double-throw switch 24, as shown. The central contacts of switch 24 are connected by conductors 25 and 26 to a galvanometer 27.

In order to test welds with this arrangement, the yoke 1 is placed upon the plate 4, with contact members 14 and 15 bridging the weld, and a direct current of about 100 amperes is passed between the electrodes 6 and 7 through leads 12 and 13. The resistance in the weld 5, if the weld is improperly made, is considerably higher than the resistance between contact members 15 and 16. In order to measure the relative resistance of the two sections of the plate, switch 24 is first caused to contact with poles 22, whereby the potential drop between members 14 and 15 is measured by the galvanometer 27. The switch 24 is then reversed, closing the circuit across members 15 and 16, the galvanometer 27 indicating the potential drop across the original material of the plate. From the relative readings, the difference in resistance of the welded portion and the original material may be readily determined and the quality of the weld thus estimated.

The modification of the invention shown in Fig. 2 comprises a yoke 30 and current-carrying coils 31 and 32 in series surrounding legs or electrodes 33 and 34, respectively, the ends of said electrodes, which are preferably of soft iron, being connected by the soft iron yoke 30. Leads 35 and 36 from said coils are connected to the poles 37 and 39 of a double-pole double-throw switch 38, the central contacts of which are connected to a suitable source of direct current, 40, a variable resistor 41 and an ammeter being placed in the line.

Contact members 43, 44 and 45 are secured in position in the yoke 30, the said contact members being equally spaced and symmetrically placed with respect to electrodes 33 and 34. A connecting member 42, usually of brass, is secured to the upper ends of said contact members and serves to hold coils 46 and 47 in position.

A coil 46 is wound on member 42 between contact members 43 and 44, and in series therewith is a second coil 47 reversely wound and placed between contact members 44 and 45. Leads 49, 50 and 51 connected to the ends of coils 46 and 47 and the junction 58, respectively, are secured to the poles 52 and 53 of a double-throw double-pole switch 54, as shown. The central poles of said switch are connected by conductors 55 and 56 to a galvanometer 57.

In order to measure the reluctance of a weld by this apparatus, I place the same in the position shown and close switch 38 on contacts 37. This causes a current to flow through coils 31 and 32, setting up magnetic flux in the iron circuit 30, 33, 4, 34. At the same time, due to the drop in potential along the plate 4, magnetic potentials are set up in contact members 43, 44 and 45.

Switch 54 is then placed in contact with poles 52, and switch 38 thrown into contact with poles 39 to reverse the current. The change in flux in the plate 4 causes changes of flux in the contact members 43, 44 and 45, causing varying currents to flow through coils 46 and 47, the amount of which is indicated by galvanometer 57. The operation is then repeated with switch 54 in the reversed position.

By this procedure, there is first measured the difference in magnetic potential drop across the weld and adjacent thereto and then the potential drop in the portion adjacent to the weld. From the data obtained, the relative reluctance of the weld and the plate and, therefore, the quality of the weld may be readily determined.

In Fig. 3 is shown an apparatus similar to that of Fig. 2 but somewhat simplified. The leads 49 and 50 are secured to two terminals of a wattmeter 60, the lead 35 being secured to the stationary coil thereof. A source of alternating current 61 of low frequency is connected in series with the stationary coil of wattmeter 60 and to the coils 31 and 32. The operation of this modified form of my invention is very similar to that of the embodiment shown in Fig. 2.

In Fig. 4 I have shown a very sensitive Sumpner voltmeter 63 connected across the line 61 by leads 64. Leads 49 and 50 from coils 46 and 47 are secured to two of the terminals of voltmeter 63, a condenser 62 being placed in the circuit.

The detailed construction of the yoke member disclosed in Figs. 2 to 4 is as follows: Electrodes 33 and 34 have their upper ends 65 threaded and secured in the soft iron yoke 30. Reels 66 are placed upon electrodes 33 and 34 and secured therein by nut 67. The lower ends of the electrodes are preferably rounded in order to make good contact with a plate, even though it is somewhat out of shape.

Depending from yoke 30 is a frame 68 of nonmagnetic material, the lower end of which carries a yoke 69. Contact members 43, 44 and 45 made of soft iron are secured therein, the lower ends 70, 71 and 72 thereof being adapted to contact with the plate to be tested. A small air gap may be left between the members and the plate to equalize the effect of scale on the flux in said members. A brass rod 73, carrying reels 74 and 75, secures the upper ends of the contact members together, the reels 74 and 75 carrying coils 46 and 47, respectively. The rod 73 provides a nonmagnetic or "air" core for coils 46 and 47. Springs 76 serve to yieldingly hold the contact members in operative positions. To increase the sensitiveness of the instrument, it may be advisable to use high permeability iron cores.

In order to limit the relative degree of movement of the contact members, I provide pivots 77 at the lower ends of the contact members and mount thereon a lever 78, the central portion 79 of which is slotted, said portion embracing pivot 77 on contact member 44 and allowing vertical motion thereof with respect to said lever 78.

An insulating member 80 is mounted on frame 68 and is adapted to carry terminals 81, 82, 83, 84 and 85 to which are connected leads from coils 31, 46, 47 and 32, respectively, as shown. The said terminals are adapted to make electrical connection with the leads 35, 49, 50, 51 and 36, respectively.

If desired, the testing apparatus may be so constructed as to move on rollers 90 (Fig. 7) so that a continuous record of the quality of a weld may be obtained.

I have herein described an apparatus for and method of testing which is capable of accurately and with but little manipulation measuring the quality of a weld. Although I have described several embodiments of my invention, including both electric and magnetic methods of testing, my invention is not limited to the embodiments shown as it is apparent that various changes in details of construction and manipulation may be made in my invention without departing from the principles set forth.

I claim as my invention:

1. A method of testing welds which comprises passing electrical energy through a weld to be tested and comparing the character of the energy passing through the weld to that passing through the body of the material.

2. A method of testing welds which comprises passing electrical energy through a weld to be tested and comparing the potential drop in the weld to that in a corresponding section of the body of the material.

3. A method of testing welds which comprises passing current through a weld to be tested and comparing the potential drop in the weld to that in a corresponding section of the body of the material.

4. A method of testing welds which comprises passing magnetic flux through a weld to be tested and comparing the potential drop in the weld to that in a corresponding section of the body of the material.

5. Apparatus for testing welds comprising a plurality of electrodes adapted to bridge a weld, a plurality of contact members therebetween, and means for measuring the potential drop between said members.

6. Apparatus for testing welds comprising a plurality of electrodes adapted to bridge a weld, a plurality of equally spaced contact members therebetween, and means for measuring the potential drop between said members.

7. Apparatus for testing welds comprising a plurality of electrodes adapted to bridge a weld, a plurality of equally spaced contact members therebetween, said members being placed symmetrically with respect to said electrodes, and means for measuring the potential drop between said members.

8. Apparatus for testing welds comprising a frame, a plurality of electrodes adapted to bridge a weld secured to said frame, a plurality of contact members between said electrodes, and means for measuring the potential drop between said members.

9. Apparatus for testing welds comprising a plurality of electrodes adapted to bridge a weld, means for supplying current thereto, a plurality of contact members therebetween and means for measuring the potential drop between said members.

10. Apparatus for testing welds comprising a plurality of electrodes adapted to bridge a weld, current-carrying coils on said electrodes for supplying magnetic energy thereto, a plurality of contact members therebetween and means for measuring the potential drop between said members.

11. Apparatus for testing welds comprising a plurality of electrodes adapted to bridge a weld, a yoke across one end of said electrodes, current-carrying coils on said electrodes for supplying magnetic energy thereto, a plurality of contact members therebetween and means for measuring the potential drop between said members.

12. Apparatus for testing welds comprising a plurality of electrodes adapted to bridge a weld, means for causing said electrodes to contact with material to be tested, a plurality of contact members between said electrodes and means for measuring the potential drop between said members.

13. Apparatus for testing welds comprising a plurality of electrodes adapted to bridge a weld, a plurality of contact members therebetween, means for measuring the potential drop between said members, and means for causing said electrodes and members to contact with material to be tested.

14. Apparatus for testing welds comprising a plurality of electrodes adapted to bridge a weld, a plurality of contact members therebetween, means for measuring the potential drop between said members, and springs for causing said electrodes and members to make contact with material to be tested.

15. Apparatus for testing welds comprising a plurality of electrodes adapted to bridge a weld, current-carrying coils on said electrodes for supplying magnetic energy thereto, a plurality of contact members therebetween, coils on said members, and means for measuring the potential drop between said members.

16. Apparatus for testing welds comprising a plurality of electrodes, a yoke joining said electrodes, current-carrying coils on said electrodes and a plurality of contact members carried by said yoke.

17. Apparatus for testing welds comprising a plurality of electrodes, a yoke joining said electrodes, current-carrying coils on said electrodes and a plurality of spring pressed contact members carried by said yoke.

18. Apparatus for testing welds comprising a plurality of electrodes, a yoke joining said electrodes, current-carrying coils on said electrodes, a plurality of contact members carried by said yoke and coils between said members.

19. Apparatus for testing welds comprising a plurality of electrodes, a yoke joining said electrodes, current-carrying coils on said electrodes, a plurality of contact members carried by said yoke, a yoke connecting said members and coils on said second yoke and between said members.

20. Apparatus for testing welds comprising a plurality of electrodes, a yoke joining said electrodes, current-carrying coils on said electrodes, a plurality of contact members carried by said yoke, and means for allowing relative motion of said members.

21. Apparatus for testing welds comprising a plurality of electrodes, a yoke joining said electrodes, current-carrying coils on said electrodes, a plurality of contact members, a support therefor, a yoke and means for causing relative motion of said members comprising a yoke loosely connected to said members and springs interposed between said members and said support.

22. Apparatus for testing welds comprising a plurality of electrodes, a yoke joining said electrodes, current-carrying coils on said electrodes, a plurality of contact members, a support therefor, and means for causing relative motion of said members comprising a yoke loosely connected to said members, springs interposed between said members and said support, and means for limiting the relative movement of said members.

23. A method of testing welds which comprises passing varying magnetic flux through a weld to be tested and comparing the potential drop in the weld to that in a corresponding section of the body of the material.

24. A method of testing welds which comprises providing a source of alternating current, passing energy therefrom through a weld to be tested and comprising the character of the energy passing through the weld with that passing through the body of the material.

25. A method of testing welds which comprises providing a source of alternating current, passing energy therefrom through a weld to be tested and comparing the potential drop in the same with that in a corresponding section of the body of the material.

26. A method of testing welds which comprises passing electrical energy through a weld to be tested and comparing the character of the energy passing through the weld to that passing through the body of the material at a plurality of points along the welded portion.

27. A method of testing welds which comprises passing electrical energy through a weld to be tested and comparing the character of the energy passing through the weld to that passing through the body of the material along the welded portion.

28. Apparatus for testing welds comprising a plurality of electrodes adapted to bridge a weld, a plurality of contact members therebetween, means for measuring the potential drop between said members, and means for moving said electrodes and contact members along the welded portion.

29. Apparatus for testing welds comprising a plurality of electrodes adapted to bridge a weld, a plurality of contact members therebetween, means for measuring the potential drop between said members, and a plurality of rollers, said electrodes and contact members being mounted thereon.

30. Apparatus for testing welds comprising a plurality of electrodes, a yoke joining said electrodes, current-carrying coils on said electrodes, a plurality of contact members carried by said yoke, coils between said members, and non-magnetic cores for said latter coils.

In testimony whereof, I have hereunto subscribed my name this 11th day of April, 1921.

ISAAC F. KINNARD.